United States Patent
Ko

(10) Patent No.: US 7,191,476 B1
(45) Date of Patent: Mar. 20, 2007

(54) MULTI-FUNCTIONAL SWITCHING APPARATUS FOR BATHROOM SHOWERS

(75) Inventor: Hsi Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 11/391,400

(22) Filed: Mar. 29, 2006

(51) Int. Cl.
*E03C 1/04* (2006.01)

(52) U.S. Cl. .......................................... 4/675

(58) Field of Classification Search ............. 4/675–678
See application file for complete search history.

(56) References Cited

U.S. PATENT DOCUMENTS

| | | | | |
|---|---|---|---|---|
| 5,826,611 A | * | 10/1998 | Ko | 137/100 |
| 5,826,615 A | * | 10/1998 | Ko | 137/454.6 |
| 5,871,032 A | * | 2/1999 | Ko | 137/625.47 |
| 5,901,387 A | * | 5/1999 | Fan | 4/675 |
| 6,012,476 A | * | 1/2000 | Ko | 137/98 |
| 6,880,565 B2 | * | 4/2005 | Ouyoung | 137/98 |

* cited by examiner

*Primary Examiner*—Charles E. Phillips
(74) *Attorney, Agent, or Firm*—Troxell Law Office PLLC

(57) ABSTRACT

A multi-functional switching apparatus for bathroom showers comprises first/second control valves, first/second adjusting valve units, first/second control valve spindle units, and first/second handle units wherein the second control valve has a coupling portion fluidly connected to the first control valve. In addition to an upper valve, a watertight ring, a lower valve, and a hoop respectively, the first adjusting valve unit also has a packing piece, and the second adjusting valve unit a positioning collar. Both first/second control valve spindle units have a valve spindle with coupling sections and fixing sections disposed thereon respectively. An adjusting device is mounted to the first valve spindle, and a flow-switching device to the second valve spindle. The first/second handle units with a handle and a cross-shaped grip also include a fixed cover, a cover seat, and a cap respectively. Therefore, the present invention can regulate water discharge as demanded, providing multi-functional application thereby.

9 Claims, 8 Drawing Sheets

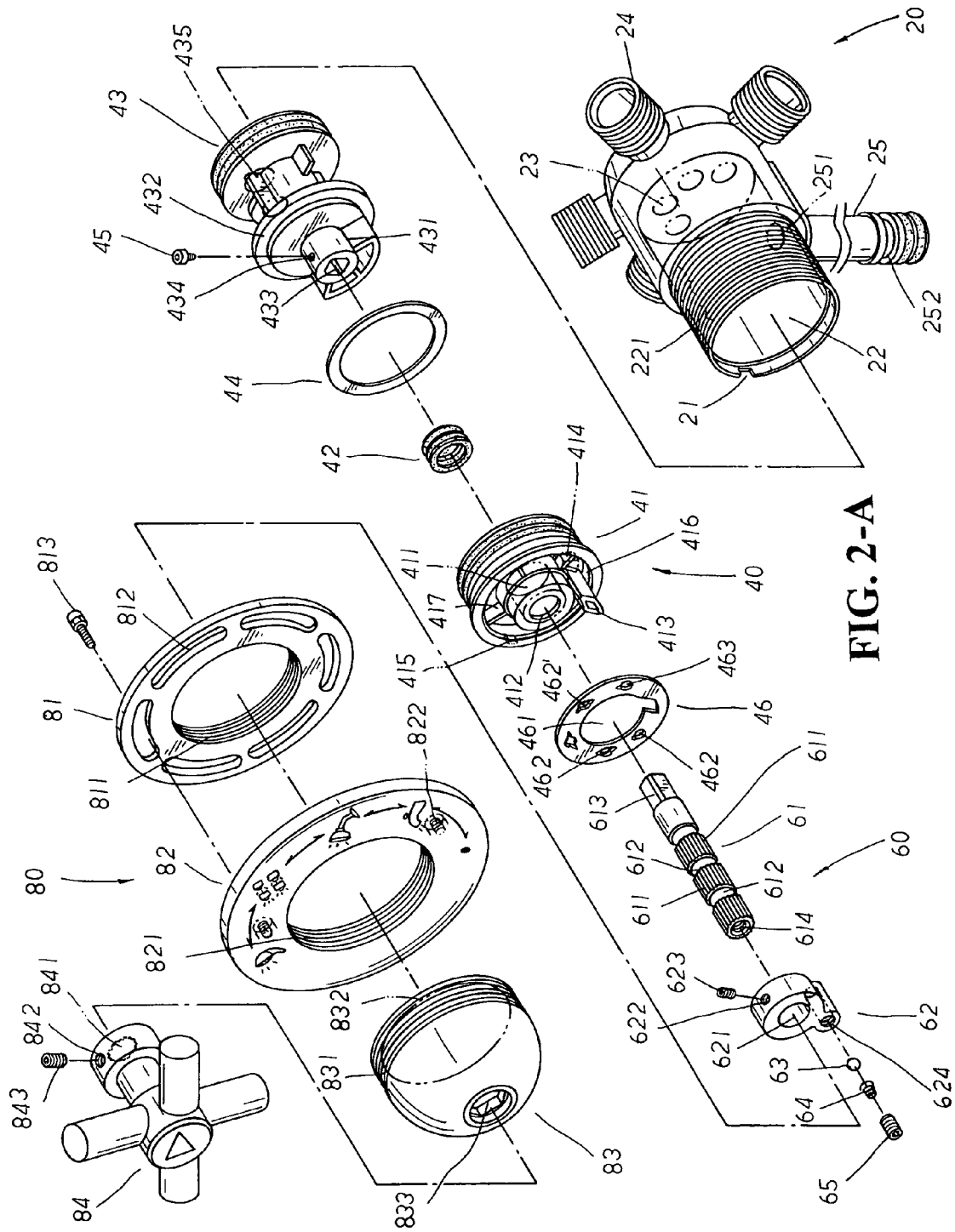
FIG. 2-A

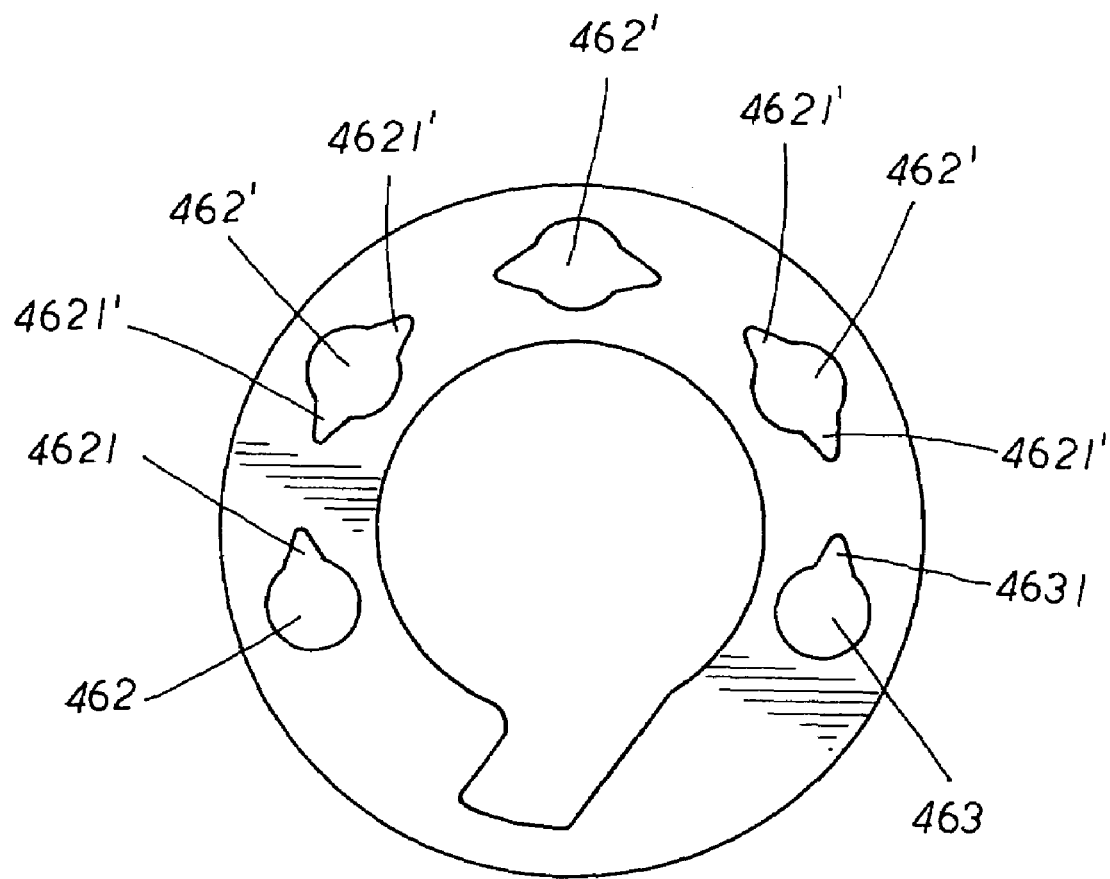
FIG. 2-B

MULTI-FUNCTIONAL SWITCHING APPARATUS FOR BATHROOM SHOWERS

BACKGROUND OF THE INVENTION

The present invention relates to a multi-functional switching apparatus for bathroom showers, comprising first and second control valves, first and second adjusting valve units, first and second control valve spindle units, and first and second handle units wherein the first and second control valve spindle units are respectively equipped with a valve spindle defined by coupling sections, fixing sections, and a screw-threaded opening thereon so that various handles can be horizontally and vertically mounted thereto, and the first and second handle units are respectively provided with a fixed cover having regulating slots disposed thereon, permitting flexible assembly and multi-functional application thereby.

Conventionally, people may bathe by way of taking a shower or a bath. In case of cleansing by showering, a user may have to hold on to a showerhead by one hand so as to control the direction of water discharge for cleansing thereof. Thus, the user must repeatedly grip the showerhead in the process of showering, which makes the conventional showering apparatus very inconvenient and limited in application.

SUMMARY OF THE PRESENT INVENTION

It is, therefore, the primary purpose of the present invention to provide a multi-functional switching apparatus for bathroom showers wherein first and second control valve spindle units are respectively equipped with a valve spindle defined by coupling sections, fixing sections, and a screw-threaded opening thereon so that various handles can be horizontally and vertically mounted thereto, facilitating widespread assembly in a convenient manner thereof.

It is, therefore, the second purpose of the present invention to provide a multi-functional switching apparatus for bathroom showers wherein first and second handle units are respectively provided with a fixed cover having regulating slots disposed thereon, permitting more convenient and flexible assembly thereby.

It is, therefore, the third purpose of the present invention to provide a multi-functional switching apparatus for bathroom showers wherein a water-switching device is mounted to the second control valve spindle unit to match to a positioning collar of a second control valve unit with a positioning aperture, multiple positioning orifices and a stop aperture disposed thereon so as to regulate water flow transported to various showering heads for different discharge effects or to interrupt the water discharge thereby, providing more convenience and options in application thereof.

BRIEF DESCRIPTION OF THE DRAWINGS

FIG. 2-A is another exploded perspective view of the present invention.

FIG. 2-B is an enlarged flat view of a positioning collar of the present invention.

DETAILED DESCRIPTION OF THE PREFERRED EMBODIMENTS

Figure 1:
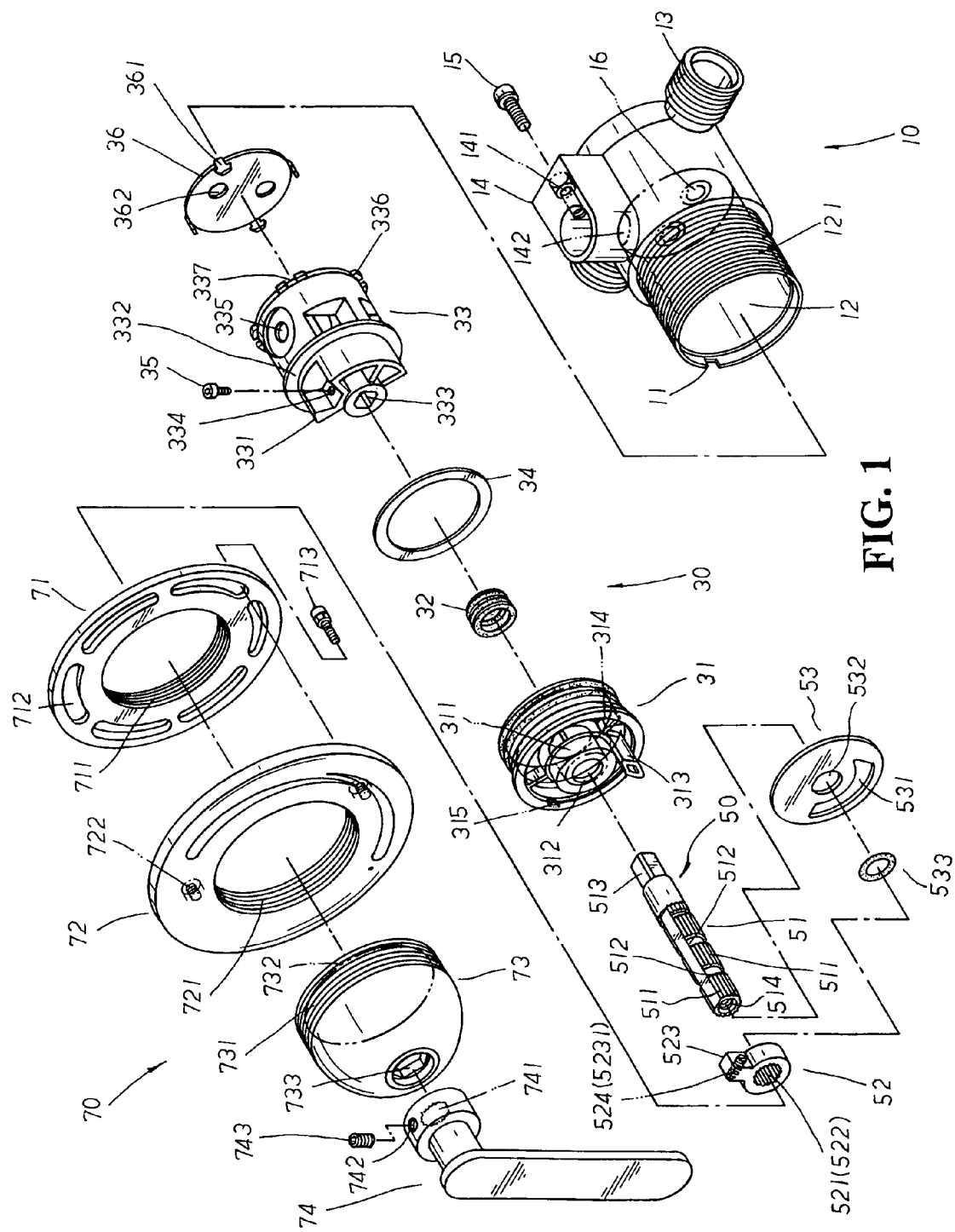
FIG. 1 is an exploded perspective view of the present invention.

Please refer to FIG. 1 showing an exploded perspective view of the present invention (accompanied by FIG. 2-A showing another exploded perspective view of the present invention). The present invention relates to a multi-functional switching apparatus for bathroom showers, comprising a set of first and second control valves 10, 20, a set of first and second adjusting valve units 30, 40, a set of first and second control valve spindle units 50, 60, and a set of first and second handle units 70, 80. The first and the second control valves 10, 20 are respectively provided with an insert recess 11, 21 preset at the edge of the upper end thereon and a receiving chamber 12, 22 with external screw threads 121, 221 defining the outer periphery thereon. The first control valve 10 has a set of cold and hot water inlet tubes 13 symmetrically extending at preset positions of both lateral sides thereon, and one side equipped with a connecting portion 14 with a screw hole 141 defining thereon for the registration of a matched screw element 15 therewith. The connecting portion 14 thereof has a flow passage 142 defining therein to communicate with the receiving chamber 12 thereby, and the receiving chamber 12 has a set of water inlets 16 symmetrically disposed at appropriate positions of the bottom end thereon to fluidly associate with the cold/hot water inlet tubes 13 thereby. The second control valve 20 has a plurality of water intake ports 23 disposed at the bottom end of the receiving chamber 22 thereon to communicate with a plurality of water outlet ducts 24 respectively thereby, and a coupling portion 25 having a flow-passing channel 251 defining therein is provided protruding at one side of the second control valve 20 thereof. The coupling portion 25 has a locking groove 252 indented at an appropriate position thereon to fit to the screw hole 141 of the connecting portion 14 of the first control valve 10 thereof. The first and second adjusting valve units 30, 40 are respectively composed of an upper valve 31, 41, a watertight ring 32, 42, a lower valve 33, 43, and a coupling hoop 34, 44. The first adjusting valve unit 30 also includes a packing piece 36 and the second adjusting valve unit 40 has a positioning collar 46. Each upper valve 31, 41 of the first and second adjusting valve units 30, 40 thereof has an accommodating groove 311, 411 defining therein for the accommodation of the watertight ring 32, 42 therein, an opening 312, 412 extending therethrough to communicate with the accommodating groove 311, 411 thereby, a restricting element 313, 413 protruding at one side thereon, a stop flange 314, 414 extending at the lower step of the accommodating groove 311, 411 thereon, and an insert block 315, 415 protruding at the outer periphery of one side thereon respectively. The upper valve 41 of the second adjusting valve unit 40 has an upper end defined by an indented cavity 416 with a plurality of ribs 417 annularly arranged therein for the abutting location of the positioning collar 46 thereby. The positioning collar 46 is composed of a central thru-hole 461 disposed in the middle (referring to FIG. 2-B), a positioning aperture 462 with one guiding slit 4621 cut at one side thereon, multiple positioning orifices 462' each having a set of sliding slits 4621' cut at both sides thereon, and a stop aperture 463 with one gliding slit 4631 cut at one side thereon wherein the guiding slit 4621, the sliding slits 4621' and the gliding slit 4631 thereof are respectively made in a V-shaped configuration. The lower valves 33, 43 of the first and second adjusting valve units 30, 40 thereof are respectively equipped with a positioning upper end 331, 431 to form a retaining space 332, 432 thereon for the engagement of the matched coupling hoop 34, 44 therewith, a fitting groove 333, 433 with a screw hole 334, 434 preset at appropriate positions thereon, and a matched screw element 35, 45 locked to the screw hole 334, 434 thereof. The lower valve 33 of the first adjusting valve unit 30 has a water intake port 335 disposed at the lower end thereon and a plurality of protrusions 336 annularly extending at the bottom edge thereon to define a plurality of conjoining sections 337 for secure engagement of multiple insert hooks 361 of the matched packing piece 36 therewith. The packing piece 36 thereof has a set of water intakes 362 symmetrically disposed at appropriate positions thereon, and the lower valve 43 of the second adjusting valve unit 40 has a water intake orifice 435 disposed at the bottom side thereon.

The first and second control valve spindle units 50, 60 are respectively equipped with a first valve spindle 51 and a second valve spindle 61 each having a plurality of serrate-toothed coupling sections 511, 611 with multiple fixing sections 512, 612 formed thereon, an inserting section 513, 613 extending at the lower end thereon, and a screw-threaded opening 514, 614 defining the upper end therein. The first control valve spindle unit 50 also includes an adjusting device 52 having a central bore 521 defined by a serrate-toothed connecting section 522 thereon. One side of the adjusting device 52 is disposed a limiting block 523 having inner screw threads 5231 defining therein for the registration of a screw shaft 524 therewith. A linking plate 53 is provided with a limiting slot 531 to match to the restricting element 313 of the upper valve 31 thereby, and a coupling hole 532 disposed in the center thereon for the engagement of the first valve spindle 51 therewith. The second control valve spindle unit 60 has an 8-shaped water-switching device 62 mounted thereto. The water-switching device 62 is provided with a bore 621 with a screw hole 622 disposed thereon for the registration of a screw element 623 therewith. At one side of the water-switching device 62 is disposed a hollow threaded thru-hole 624 to which an abutted ball 63, a spring element 64, and a screw element 65 are sequentially mounted therein. The first and second handle units 70, 80 are respectively equipped with a fixed cover 71, 81, a cover seat 72, 82, and a cap 73, 83. Besides, the first handle unit 70 also includes a handle 74, and the second handle unit 80 has a cross-shaped grip 84. The fixed covers 71, 81 and the cover seats 72, 82 are respectively formed in a hollow tubular shape with internal screw threads 711, 811, 721, 821 defining the inner surface thereon respectively. The fixed covers 71, 81 are respectively provided with a plurality of regulating slots 712, 812 annularly arranged at appropriate positions thereon, and matched screw elements 713, 813 secured to the regulating slots 712, 812 thereon. Each of the cover seats 72, 82 has a set of locking portions 722, 822 symmetrically disposed at the bottom surface thereon to fit to the regulating slots 712, 812 thereby. Each of the caps 73, 83 has an external screw-threaded section 731, 831 defining the outer surface thereon, an inner threaded section 732, 832 disposed at the internal bottom edge thereon, and a central insert hole 733, 833 extending in the middle there-through. The handle 74 and the cross-shaped grip 84 are respectively provided with an insert opening 741, 841, and a screw hole 742, 842 for the registration of a matched screw element 743, 843 therewith. Each of the screw elements 15, 35, 45, 623, 65, 713, 743, 813, 843 thereof can have a polygonal-shaped (like hexagonal shape) fixing hole disposed thereon respectively to match to a wrench tooling for assembly thereby.

Figure 3:
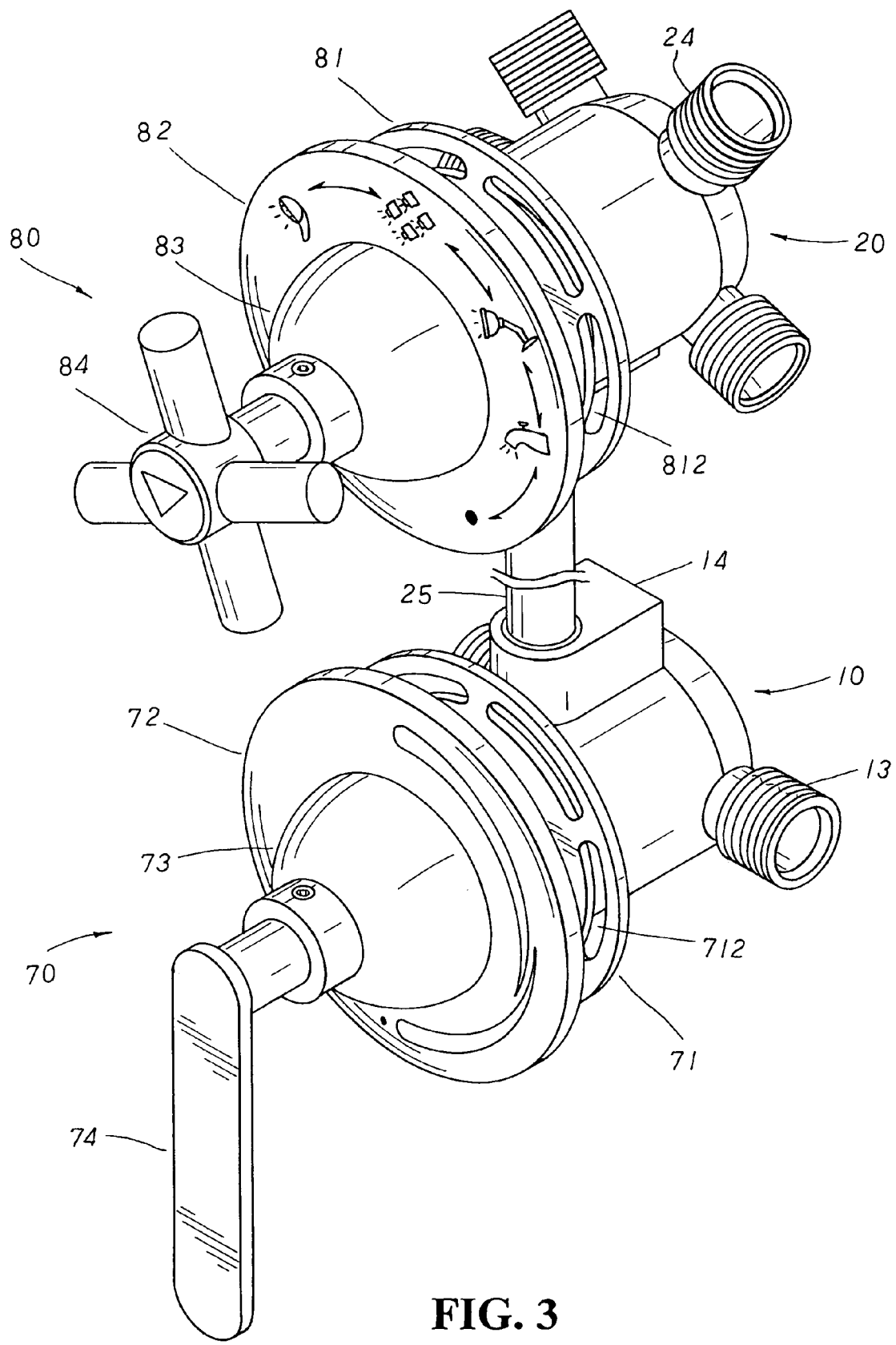
FIG. 3 is an assembled perspective view of the present invention.
Figure 4:
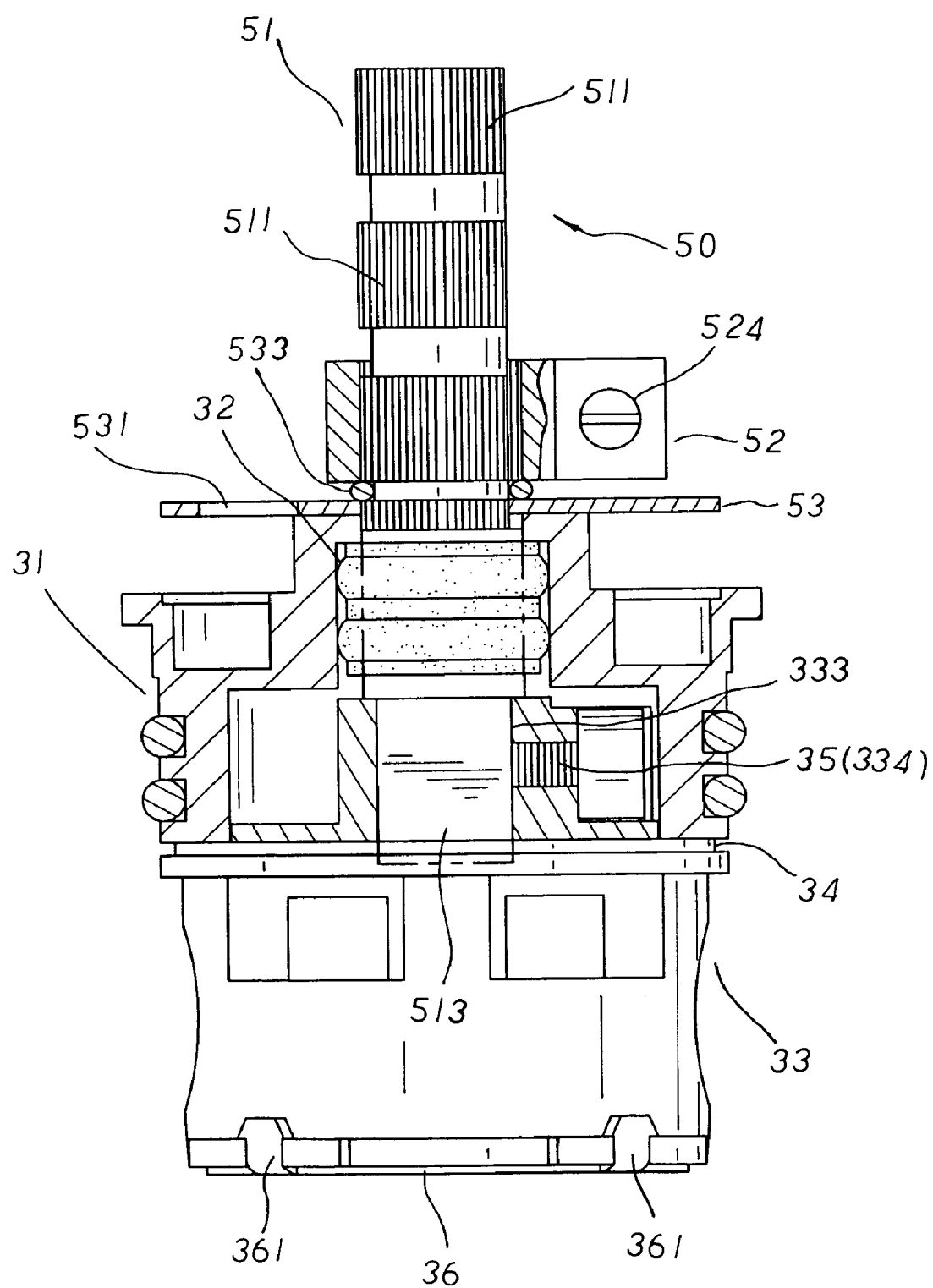
FIG. 4 is a partially assembled and cross sectional view of the present invention as shown in FIG. 1.

Please refer to FIG. 3 showing an assembled perspective view of the present invention. In assembly, the watertight ring 32 of the first adjusting valve unit 30 is mounted into the accommodating groove 311 of the upper valve 31 to locate at an appropriate position therein, and the coupling hoop 34 is joined to the retaining space 332 of the lower valve 33. Then, the insert section 513 of the first valve spindle 51 thereof is joined to the fitting groove 333 of the lower valve 33 till located at an appropriate position therein, and the screw element 35 is locked to the screw hole 334 (referring to FIG. 4) to secure tight the first valve spindle 51 in place thereby. The opening 312 of the upper valve 31 is guided through the first valve spindle 51 to mount the upper valve 31 firmly onto the lower valve 33 in mutual engagement therewith. And the insert hooks 361 of the packing piece 36 are respectively fitted to the conjoining sections 337 defined by the protrusions 336 of the lower valve 33 thereof. The coupling hole 532 of the linking plate 53 is sleeved to the first valve spindle 51, permitting the restricting element 313 thereof to accommodate into the limiting slot 531 and restrained in location thereby before a water-sealing ring 533 is mounted to abut against the surface of the linking plate 53 thereon. The central bore 521 of the adjusting device 52 is guided to the first valve spindle 51, permitting the serrate-toothed connecting section 522 thereof to precisely mesh with the serrate-toothed coupling sections 511 of the first valve spindle 51 for secure location thereby. Then, the screw shaft 524 secured to the inner screw threads 5231 of the limiting block 523 thereof is limited by the restricting element 313 to achieve positioning effect thereby. The fixed cover 71 of the first handle unit 70 is mounted to an appropriate position at the outer surface of the receiving chamber 12 of the first control valve 10 thereon, permitting the internal screw threads 711 thereof to reciprocally secure onto the external screw threads 121 of the receiving chamber 12 thereof. Then, the first adjusting valve unit 30 is accommodated into the receiving chamber 12 of the first control valve 10, permitting the insert block 315 of the upper valve 31 to precisely join to the insert recess 11 of the first control valve 10 in a state of restricted location so as to firmly fix the first adjusting valve unit 30 onto the first control valve 10 thereby. The cover seat 72 is led from the upper end of the first valve spindle 51 to mount onto the first control valve 10, permitting the locking portions 722 thereof to abut against the fixed cover 71 at appropriate positions thereof. The central insert hole 733 of the cap 73 is then guided through the upper end of the first valve spindle 51 to couple onto the first control valve 10, permitting the inner threaded section 732 thereof to secure to the external screw threads 121 defining the outer surface of the receiving chamber 12 of the first control valve 10 and the external screw-threaded section 731 thereof to lock to the internal screw threads 721 of the cover seat 72 respectively so as to firmly fix the cap 73 in position thereby. And the insert opening 741 of the handle 74 is joined to the upper end of the first valve spindle 51 and securely locked thereto via the screw element 743 secured into the screw hole 742 till abutted tight against the matched fixing section 512 so as to firmly locate the handle 74 at an appropriate position of the first valve spindle 51 thereon. Besides, the screw-threaded opening 514 defining the upper end of the first valve stem 51 can be matched to various types of handles mounted from the upper end thereof to be fitted thereto in position (as non-illustrated in the diagrams).

Figure 5:
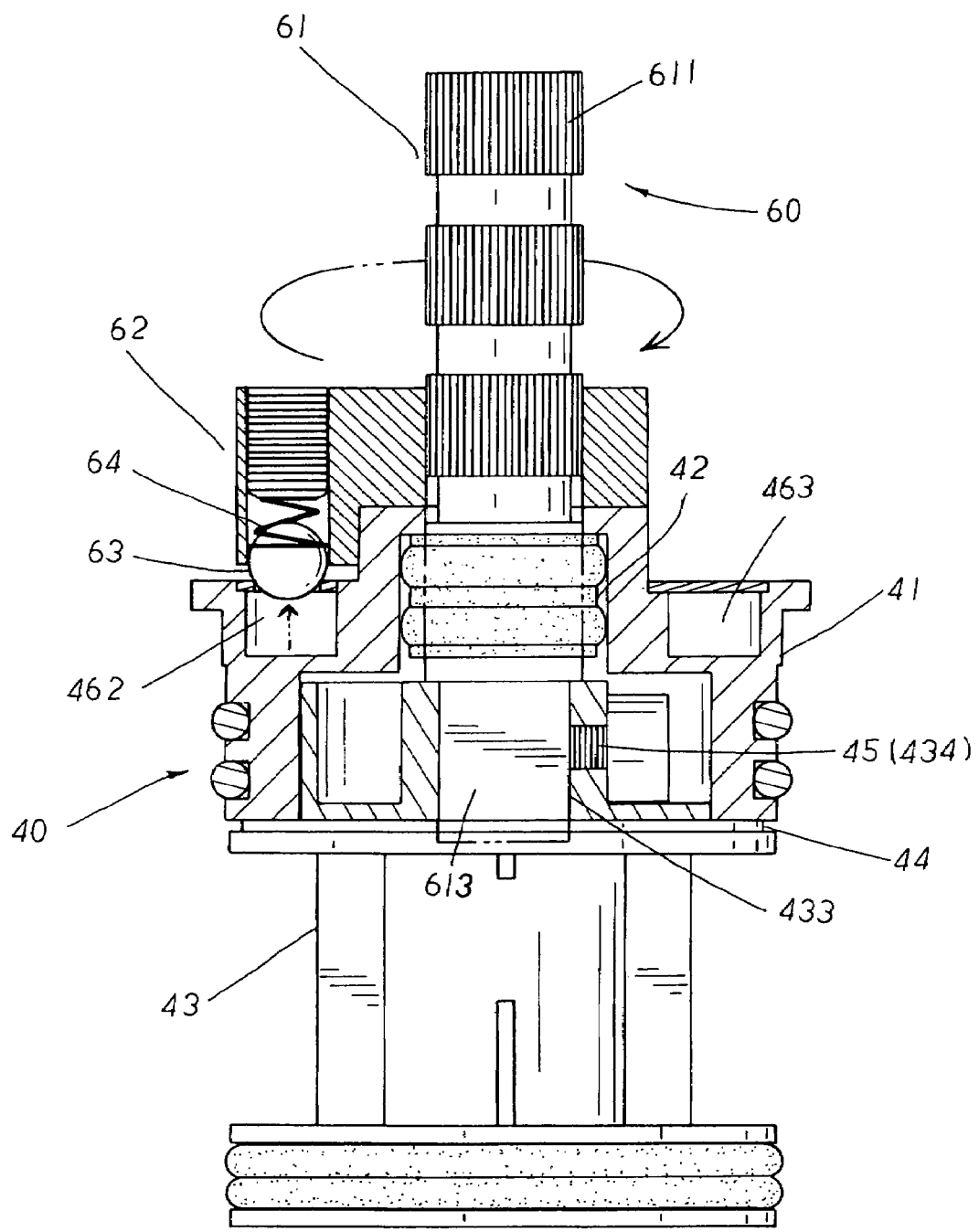
FIG. 5 is a partially assembled and cross sectional view of the present invention as shown in FIG. 2 in a state of operation.

Furthermore, the watertight ring 46 of the second adjusting valve unit 40 is mounted into the accommodating groove 411 of the upper valve 41 to locate at an appropriate position therein, and the coupling hoop 44 is joined to the retaining space 432 of the lower valve 43. Then, the insert section 613 of the second valve spindle 61 thereof is inserted to the fitting groove 433 of the lower valve 43 till located at an appropriate position therein, and the screw element 45 is locked to the screw hole 434 (referring to FIG. 5) to abut tight against the second valve spindle 61 in secure location thereby. Via the central thru-hole 461, the positioning collar 46 is mounted to the upper valve 41 thereon and limited in position by the ribs 417 and the restricting element 413 thereof. Then, the opening 412 of the upper valve 41 is guided to the second valve spindle 61 to engage the upper valve 41 firmly with the lower valve 43 thereby, and the bore 621 of the water-switching device 62 is threaded through the second valve spindle 61 till located at an appropriate position thereon. The abutted ball 63 is then placed onto the positioning aperture 462 of the positioning collar 46, and the spring element 64 is accommodated into the threaded thru-hole 624 to fit to the abutted ball 63 disposed beneath, permitting the upper edge of the abutted ball 63 to accommodate into the bottom edge of the threaded thru-hole 624 and flexibly support by the end edge of the spring element 64 thereof. Then, the screw element 65 is locked into the threaded thru-hole 624 to restrict the abutted ball 63 in position thereby, and the screw element 623 is secured to the screw hole 622 to firmly fix the water-switching device 62 onto the second valve spindle 61 thereby. The fixed cover 81 of the second handle unit 80 is mounted to an appropriate position at the outer surface of the receiving chamber 22 of the second control valve 20 thereon, permitting the internal screw threads 811 thereof to lock onto the external screw threads 221 of the receiving chamber 22 thereof for secure mutual engagement therewith. The second adjusting valve unit 40 is accommodated into the receiving chamber 22 of the second control valve 20, permitting the insert block 415 of the upper valve 41 to precisely join to the insert recess 21 of the second control valve 20 in limiting location thereby. The cover seat 82 is led from the upper end of the second valve spindle 61 to mount onto the second control valve 20, permitting the locking portions 822 thereof to abut against the fixed cover 81 at appropriate positions thereof. The central insert hole 833 of the cap 83 is then guided through the upper end of the second valve spindle 61 to couple onto the second control valve 20, permitting the inner threaded section 832 thereof to secure to the external screw threads 221 defining the outer surface of the receiving chamber 22 of the second control valve 20 and the external screw-threaded section 831 thereof to lock to the internal screw threads 821 of the cover seat 82 respectively for secure location thereof. And the insert opening 841 of the cross-shaped grip 84 is joined to the upper end of the second valve spindle 61 and securely locked thereto via the screw element 843 secured into the screw hole 842 till abutted tight against the matched fixing section 612 at an appropriate position of the second valve spindle 61 thereon. Besides, the screw-threaded opening 614 defining the upper end of the second valve spindle 61 can be matched to various types of handles mounted from the upper end thereof till fixed thereto in position (as non-illustrated in the diagrams). Finally, the coupling portion 25 of the second control valve 20 is reciprocally engaged with the connecting portion 14 of the first control valve 10 and conjoined to an appropriate position of the flow passage 142 thereof. Then, the screw element 15 is secured into the screw hole 141 thereof till fixed onto the locking groove 252 of the coupling portion 25 so that the first and the second control valve 10, 20 can be tightly locked to each other to complete the assembly thereof.

Figure 6:
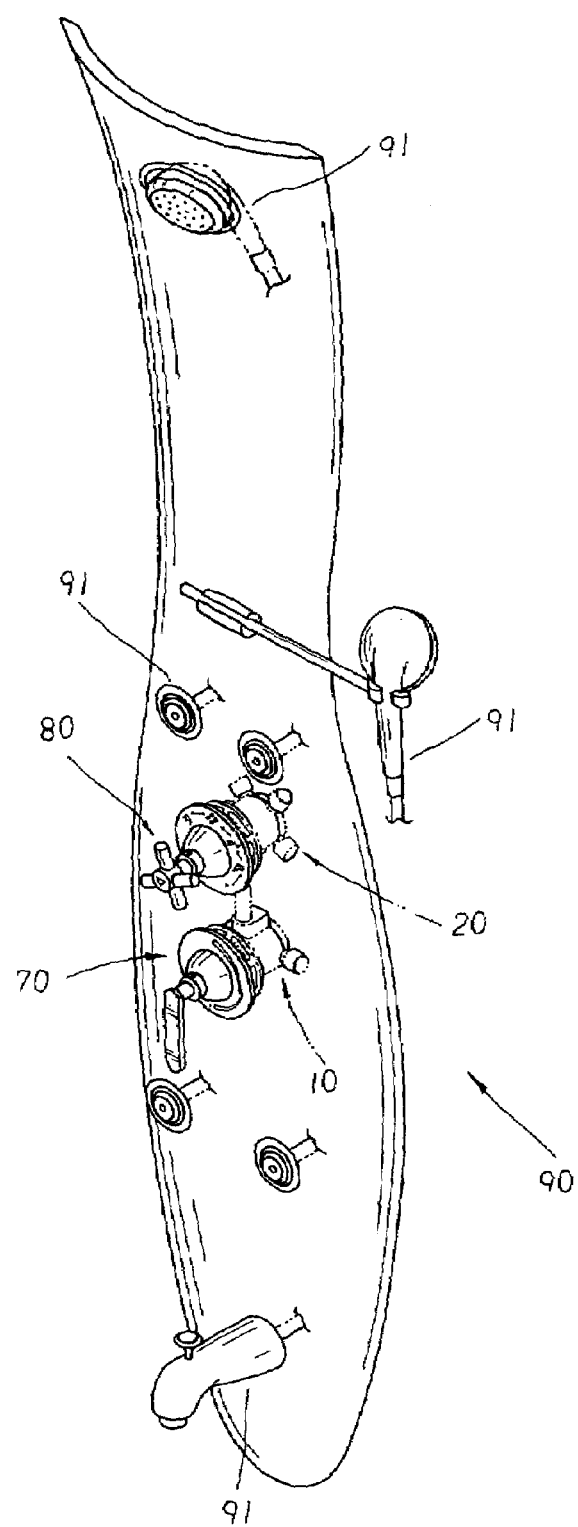
FIG. 6 is an assembled perspective view of the present invention in application.
Figure 7:
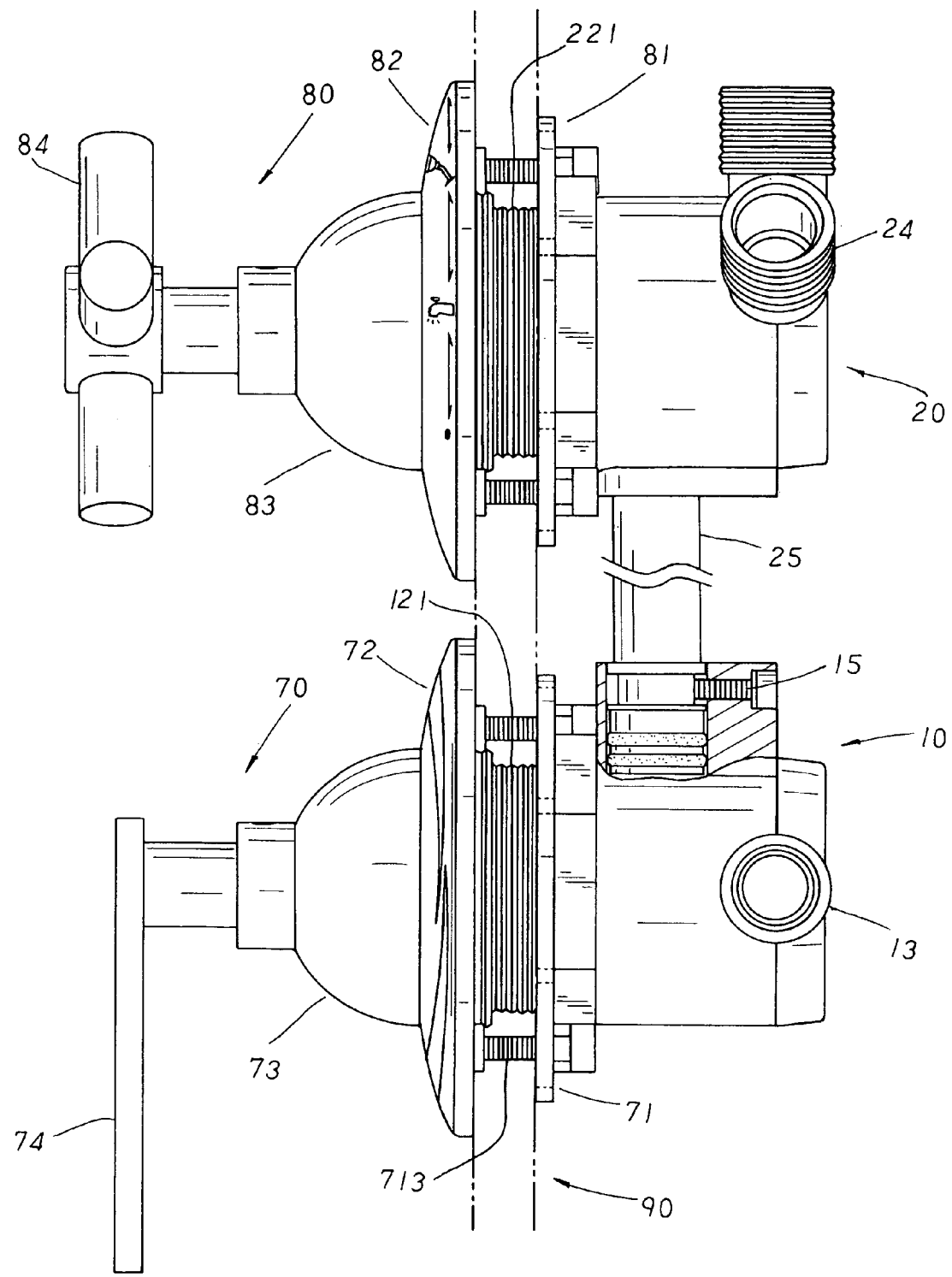
FIG. 7 is an assembled flat view of the present invention in application.

Please refer to FIG. 6 showing an assembled perspective view of the present invention in application (accompanied by FIG. 7 showing an assembled flat view of the present invention in application). The connected first and second control valves 10, 20 are appropriately combined with a showering apparatus 90, permitting the water outlet ducts 24 of the second control valve 20 to respectively connect to the piping of a matched showering head 91 thereby. And via the regulating slots 712, 812 of the fixed covers 71, 81, the screw elements 713, 813 can be securely fixed onto the locking portions 722, 822 of the cover seats 72, 82 wherein the regulating slots 712, 812 allow flexible change of the locking positions for installment thereof depending on the demand of a user. In application, the handle 70 is rotated to one side, actuating the movement of the lower valve 33 therewith. Meanwhile, the positioning upper end 331 of the lower valve 33 is restricted in position by the stop flange 314 of the upper valve 31 thereof, permitting cold and hot water coming from the cold and hot water inlet tubes 13 disposed at both sides of the first control valve 10 thereon to sequentially flow from the water inlets 16 disposed at the bottom end of the first control valve 10, through the water intakes 362 of the packing piece 36 and then the water intake port 335 of the first adjusting valve unit 30 to enter the flow passage 142 of the connecting portion 14 thereof before moving on to the second control valve 20 via the flow-passing channel 251 of the coupling portion 25 thereof. And depending on the demand of a user, the screw shaft 524 of the adjusting device 52 can be adjusted to alter its length extending outside the limiting block 523 thereof. When the screw shaft 524 is adjusted to extend outside the limiting block 523 at a longer length, the rotating radius of the screw shaft 524 to abut against the restricting element 313 of the upper valve 31 will become shortened so as to efficiently control the amount of water discharge thereby (meanwhile, the linking plate 53 is actuated therewith, permitting the limiting slot 513 to rotate along the restricting element 313 to achieve the purpose of restrained guidance thereby). After the water flow goes through the flow-passing channel 251 of the coupling portion 25 of the second control valve assembly 20, the cross-shaped grip 84 can be rotated to fit to the demand of the user. Then, the second valve spindle 61 will actuate the abutted ball 63 of the water-switching device 62 therewith (referring the FIG. 5). Via the guidance effect provided by the guiding slit 4621 and the sliding slits 4621' of the positioning collar 46 thereof, the abutted ball 63 can be smoothly moved along the positioning collar 46 to shift position till relocated into one of the matched positioning aperture 462 or the positioning orifices 462' thereof. Meanwhile, the water intake orifice 435 of the lower valve 43 thereof will be switched to match to one of the water intake ports 23 fluidly connected to the showering apparatus 90 thereof so that the water flow can be transported outwards via different showering heads 91 thereby. Furthermore, the positioning upper end 431 of the lower valve 43 is restricted in position by the stop flange 414 of the upper valve 41 thereof. And, when the abutted ball 63 is guided along the positioning collar 46 via the sliding slits 4621' of the positioning orifices 462' and the gliding slit 4631 of the stop aperture 463 thereof, and moved to relocate into the stop aperture 463, the water flow will be interrupted so as to shut off the water discharge from the showering heads 91 thereof. Thus, the present invention can easily regulate water discharge as demanded, facilitating convenient and speedy application and providing multiple functions thereby.

What is claimed is:

1. A multi-functional switching apparatus for bathroom showers, comprising a set of first and second control valves, a set of first and second adjusting valve units, a set of first and second control valve spindle units, and a set of first and second handle units wherein the first and the second control valves are respectively provided with an upper end having an insert recess preset at the edge thereof and a receiving chamber with external screw threads defining the outer periphery thereof;

the first control valve having a set of cold and hot water inlet tubes symmetrically extending at preset positions of both lateral sides thereof, and one side equipped with a connecting portion with a screw hole defined thereon for the registration of a screw element therewith wherein the connecting portion has a flow passage defined therein to communicate with the receiving chamber thereby, and the receiving chamber has a set of water inlets symmetrically defining the appropriate positions of the bottom side to fluidly associate with cold and hot water inlet tubes;

the second control valve having a plurality of water intake ports disposed at the bottom end of the receiving chamber thereon to communicate with a plurality of water outlet ducts respectively, the first and second adjusting valve units being respectively composed of an upper valve, a watertight ring, a lower valve, and a coupling hoop; the first adjusting valve unit also includes a packing piece and the second adjusting valve unit also has a positioning collar wherein each upper valve of the first and second adjusting valve units has an accommodating groove defined therein for the accommodation of the watertight ring therein, a restricting element protruding at one side thereon, a stop flange preset at a lower step of the accommodating groove thereon, and an insert block extending at the outer periphery of one side thereof;

the upper valve of the second adjusting valve unit also having an upper end defined by an indented cavity with a plurality of ribs annularly arranged therein for the abutting location of the positioning collar thereby;

each lower valve of the first and second adjusting valve units having a positioning upper end to form a retaining space thereon for the engagement of the coupling hoop therewith wherein the lower valve of the first adjusting valve unit has a water intake port disposed at the lower end thereon and a plurality of protrusions annularly extending at the bottom edge thereon to define a plurality of conjoining sections for secure connection of insert hooks of the matched packing piece therewith, and the packing piece has a set of water intakes symmetrically disposed at appropriate positions thereon; the lower valve of the second adjusting valve unit has a water intake orifice disposed at the bottom side thereon;

the first and second control valve spindle units being respectively equipped with a first valve spindle and a second valve spindle wherein the first valve spindle has an adjusting device mounted thereto, and the adjusting device is made up of a central bore defined by a connecting section thereon, and a limiting block protruding at one side thereof;

the first and second handle units being respectively equipped with a fixed cover, a cover seat, and a cap; the first handle unit also includes a handle, and the second handle unit also has a cross-shaped grip wherein each of the fixed covers and the cover seats is formed in a hollow tubular shape with internal screw threads defining the inner surface thereon respectively; each of the cover seats has a set of locking portions symmetrically disposed at the bottom surface; each of the caps has an external screw-threaded section defining the outer surface, an inner threaded section disposed at the internal bottom edge thereon, and a central insert hole extending in the middle there-through;

the handle and the cross-shaped grip being respectively provided with an insert opening, a screw hole and a matched screw element; characterized by that;

the second control valve having a coupling portion extending at one side wherein a flow-passing channel is disposed defining the coupling portion therein;

each upper valve of the first and second adjusting valve units having an opening disposed therein to communicate with the accommodating groove thereof for the extension of the first and second valve stems therethrough respectively; each lower valve having a fitting groove with a screw hole preset at appropriate positions thereon, and a screw element matched to the screw hole;

the second adjusting valve unit having a positioning collar mounted thereto, and the first and the second control valve spindle units being respectively equipped with the first valve spindle and the second valve spindle;

the first control valve spindle unit having the adjusting device mounted thereto wherein on one side of the adjusting device is disposed a limiting block with inner screw threads defined therein for the registration of a matched screw shaft therewith; the second control valve spindle unit having a water-switching device mounted thereto;

each fixed cover of the first and second handle units has a plurality of regulating slots annularly arranged at preset positions thereon;

wherein, the present invention can achieve more flexible and convenient application, and provide multiple functions.

2. The multi-functional switching apparatus for bathroom showers as claimed in claim 1 wherein the coupling portion of the second control valve has a flow-passing channel defined therein, and a locking groove indented at an appropriate position thereon.

3. The multi-functional switching apparatus for bathroom showers as claimed in claim 1 wherein the positioning collar of the second adjusting valve unit is composed of a central thru-hole disposed in the middle, a positioning aperture with one guiding slit cut at one side thereon, multiple positioning orifices each having a set of sliding slits cut at both sides thereon, and a stop aperture with one gliding slit cut at one side thereon.

4. The multi-functional switching apparatus for bathroom showers as claimed in claim 1 wherein the first and second valve spindles of the first and second control valve spindle units are respectively equipped with a plurality of coupling sections to form multiple fixing sections thereon, an inserting section extending at the lower end thereof, and a screw-threaded opening defining the upper end therein.

5. The multi-functional switching apparatus for bathroom showers as claimed in claim 1 wherein the water-switching device of the second control valve spindle unit has a bore with a screw hole preset thereon for the registration of a matched screw element therewith, and one side of the water-switching device has a hollow threaded thru-hole disposed thereon to which an abutted ball, a spring element, and a screw element are sequentially guided to mount therein.

6. The multi-functional switching apparatus for bathroom showers as claimed in claim 1 wherein the water-switching device of the second control valve spindle unit is formed in an 8-shaped configuration.

7. The multi-functional switching apparatus for bathroom showers as claimed in claim 3 wherein the guiding slit, the sliding slits and the gliding slit of the positioning aperture, the positioning orifices, and the stop aperture are respectively cut in a V-shaped configuration.

8. The multi-functional switching apparatus for bathroom showers as claimed in claim 4 wherein the coupling sections defining the first and second valve spindles of the first and second control valve spindle units are respectively molded in serrate-toothed shape.

9. The multi-functional switching apparatus for bathroom showers as claimed in claim 1 wherein the valve spindle of the first control valve spindle unit can have a linking plate mounted thereto wherein the linking plate is provided with a limiting slot to match to a restricting element of the upper valve, and a central coupling hole disposed in the middle and identically shaped like the first valve spindle.

\* \* \* \* \*